NONLINEAR RESONANT FLIP-FLOP CIRCUIT

Filed April 23, 1952

Inventors:
Charles F. Spitzer,
Robert J. Reich,
by Merton D. Moore
Their Attorney.

Patented Sept. 22, 1953 2,653,254

UNITED STATES PATENT OFFICE 2,653,254

NONLINEAR RESONANT FLIP-FLOP CIRCUIT

Charles F. Spitzer, Syracuse, N. Y., and Robert J. Reich, Hamden, Conn., assignors to General Electric Company, a corporation of New York Application April 23, 1952, Serial No. 283,878

7 Claims. (Cl. 307—88)

Our invention relates to the art including triggered multivibrator or flip-flop circuits, and more particularly to novel flip-flop circuits having non-linear resonant circuits of which one type is commonly termed a ferroresonant circuit.

Although not specifically limited thereto, the triggered multivibrator circuit of this invention is especially well-suited for electronic digital computers or other complex electronic systems in which the problems of weight, maintenance and power requirements usually present a formidable burden. Our ferroresonant flip-flop circuit is capable of miniaturization and requires relatively inexpensive components and low-power supplies.

An object of this invention is, accordingly, to provide for a triggered multivibrator or flip-flop circuit which employs ferroresonant circuits.

It is a further object of this invention to provide for such a multivibrator which has two stable states of conduction either of which can be maintained indefinitely, and which can be changed by the application thereto of a trigger pulse of any polarity.

A further object of the invention is to provide a ferroresonant flip-flop circuit that can be utilized as the basic element of binary counters, lock circuits, switch or gate circuits and storage registers in digital computers, said ferroresonant circuit being characterized in the absence therefrom of vacuum tubes or other elements of limited reliability.

Briefly stated, the objects of our invention may be realized through the provision of a triggered multivibrator or flip-flop circuit having a pair of non-linear or ferroresonant branches so arranged that the current in one automatically affects the current in the other. Whenever a trigger pulse is applied to said circuit, whichever branch is in the low-conducting state begins to increase its conduction and the other branch, which had been in a high-conducting state begins to decrease its conduction. This condition continues until an exchange of stable states is accomplished or until another pulse is applied to the input terminal at which time the operation is reversed. The output of this circuit is, accordingly, a series of square-shaped pulses synchronized with the trigger pulses.

For additional objects and advantages, and for a better understanding of the invention, attention is now directed to the following description and accompanying drawings. The features of the invention which are believed to be novel are particularly pointed out in the appended claims.

Figure 1:
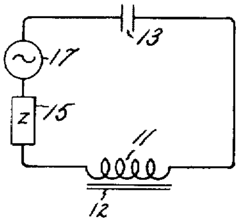
Figure 2:
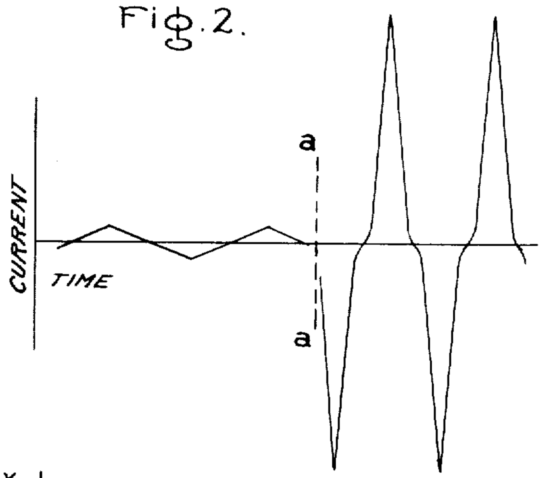
Figure 3:
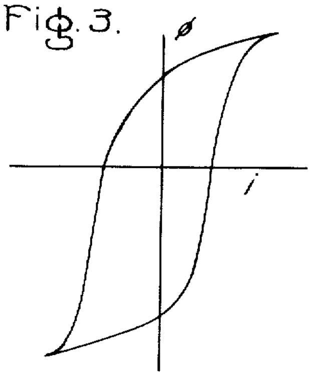
Figure 4:
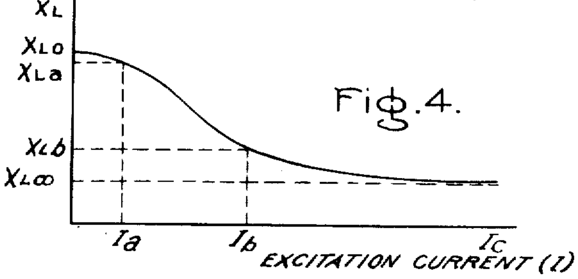
Figure 5:
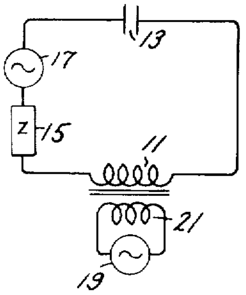
Figure 6:
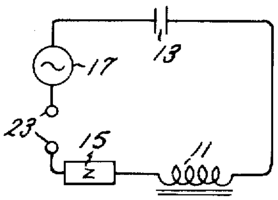
Figure 7:
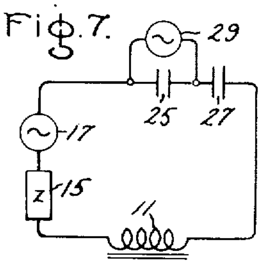
Figure 8:
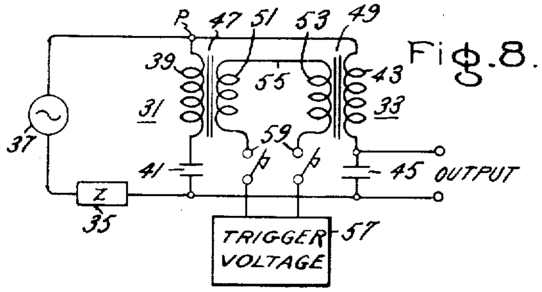

In the drawings, Fig. 1 is a diagram of a simple non-linear circuit; Fig. 2 is a graph showing the current waveforms for conditions below and at resonance in the circuit of Fig. 1; Fig. 3 is a graph showing the relation between the flux in the core of the inductor of Fig. 1 and the excitation current; Fig. 4 is a graph illustrating the relation between the inductive reactance offered to the fundamental component of the excitation current and the effective value of the fundamental component of the current; Fig. 5 is a diagram illustrating one arrangement for triggering the circuit of Fig. 1 from one stable state to another; Fig. 6 is a diagram illustrating a modified triggering arrangement; Fig. 7 is a diagram illustrative of a further modification of the triggering arrangement; and Fig. 8 is a schematic wiring diagram of a flip-flop circuit embodying the features of our invention.

The nature and theory of operation of the basic ferroresonant circuit are considered to be well known. Arrangements in which a circuit of this type is employed to provide pulsation apparatus for electric control purposes are described and claimed in U. S. Letters Patent 1,921,788, granted to Chauncey G. Suits on August 8, 1933, on application Serial No. 544,311, filed June 15, 1931, and assigned to the assignee of the present application. Our invention is an improvement over the invention of said Suits patent, which was made by said Suits prior to our invention. We, therefore, do not herein claim anything shown or described in said Suits patent, which is to be regarded as prior art with respect to this present application.

A brief discussion of the operation of ferroresonant circuits may, however, facilitate a better understanding of our flip-flop circuit. In its simplest form, ferroresonance may be observed in the circuit of Fig. 1, which comprises a saturable core inductor 11, of which the core 12 is preferably of a suitable ferro-magnetic material and formed to provide a closed magnetic loop, a capacitor 13 and an impedance 15 connected in series circuit with said inductor 11 and to a source 17 of constant-frequency variable-voltage alternating current. The impedance 15 may be omitted, if desired.

Increase of the applied alternating voltage above a critical value causes the current to jump abruptly to a very high value. The non-linear behavior resulting in the high current condition is generally referred to as ferroresonance. This operation is clearly illustrated in Fig. 2 which shows an alternating current wave of such a circuit plotted with time as abscissa and current as ordinates. At the critical voltage the wave shape changes abruptly from the usual magnetizing current shape shown at the left of line *a—a* in Fig. 2 to the sharply peaked form shown to the right of line *a—a*.

The relation between the flux in the non-linear magnetic core of the inductor 11 and the excitation current is illustrated graphically in Fig. 3, in which the flux is plotted as ordinates and the current as abscissa. This plot demonstrates the hysteresis phenomena characteristic of magnetic materials, as is well-known.

Now, if the inductive reactance $X_L$ offered to the fundamental component of the excitation current is plotted against the effective value of the fundamental current, I, as in Fig. 4, a reasonably large initial value, say $X_{L0}$, and a relatively low final value of inductive reactance, say $X_{L00}$, result. If the capacitance of the condenser 13 be selected so that the net reactance is inductive, say $X_{La}$, for relatively small impressed voltages, and, hence, small values of the effective current, as shown at $I_a$ in Fig. 4, it will be seen that an increase in supply voltage makes the circuit tend toward resonance and the current increases toward $I_b$ at which the reactance is still inductive, say $X_{Lb}$. Since the inductor 11 is iron cored, the increased current results in a reduction of the effective inductive reactance of the inductor 11, and inasmuch as the process is cumulative or regenerative, no additional increase in the supply voltage is normally required to drive the circuit into ferroresonance. This occurs within a few cycles of the supply frequency.

Thus, ferroresonance can be explained by considering that as the voltage is increased from a low value the current increases also until the core of the inductor becomes saturated. This causes a decrease in the effective inductive reactance of the inductor seen by the fundamental component of current. If the initial inductive reactance is greater than the capacitive reactance, the decrease of effective inductive reactance brings the circuit closer to resonance with resultant further increase in current. Since this effect is cumulative, the circuit snaps into ferroresonance when the applied voltage reaches the critical value.

We have found that triggering of the circuit from the high current state to the low current state can be accomplished in several different ways other than by increasing the supply voltage. For example, as shown in Fig. 5, triggering can be had by the application of one or more cycles of an alternating voltage of proper amplitude and phase derived from a source 19, the voltage being applied to the inductor 11 by inductive coupling through a transformer winding 21; or, as shown in Fig. 6, the triggering can be accomplished by the application at the terminals 23 of unidirectional pulses of any polarity.

It has been observed, further, that the application of unidirectional and/or alternating voltages across any single element or combination of elements results in triggering the circuit from the high conduction state to the low conduction state or vice versa. Furthermore, any element can be divided as, for example, the capacitor may be replaced by two or more capacitors in an equivalent circuit arrangement and the triggering voltage may then be applied across the additional terminals provided by such division. This arrangement is illustrated in Fig. 7 in which series connected capacitors 25, 27 provide an effective capacitance value equal to that of the capacitor 13 of Figs. 1, 5 and 6, and a source 29 of triggering voltage is applied across one of the capacitors, say capacitor 25.

Referring now to Fig. 8, there is shown a flip-flop circuit constructed in accordance with and embodying the features of this invention. The circuit comprises two parallel-connected ferroresonant branches 31 and 33 coupled to an alternating power supply 37 by a circuit including a common impedance here shown as an element 35, which in a preferred form may be a capacitance of suitable value.

Branch 31 comprises a series connection of a saturable-core inductor 39 and a capacitor 41 while branch 33 comprises a similar connection of saturable core inductor 43 and a capacitor 45. The inductors 39 and 43 are preferably of identical values and can be the secondary windings of respective transformers 47 and 49 of which the primaries 51 and 53 are connected to each other as by a conductor 55 and to a source 57 of trigger pulses of any suitable conventional type. The connection to the source 57 may be at a pair of signal input terminals 59. The output of the flip-flop circuit may be taken across either condenser 41 or 45 or inductor 39 or 43, and for illustrative purposes the output is shown taken across capacitor 45. If desired, a suitable load resistor may be connected in series with either or both of branches 31 and 33.

The application of pulses of any polarity causes the branches 31 and 33 to assume one or the other of the stable states, successive pulses operating to cause one of the branches to drop out of its instant state and to cause the other to assume the state vacated by the first.

Let it be assumed that the branch 31 is in the high-conduction state and branch 33 is in the low-conduction state when a pulse from the source 57 is applied. The application of the pulse tends to drive branch 33 into the high-conduction state and thus causes the voltage at point P at the junction of the inductors 39 and 43 to drop. The voltage drop causes the current in branch 31 to begin decreasing causing that branch to drop out of resonance.

At the termination of the pulse, neither branch is in resonance nor completely out of resonance, and the voltage at P accordingly starts to rise. The rise in voltage at P causes one or the other of the branches to go toward resonance and, since branch 33 is instantly tending in that direction and branch 31 is instantly tending away therefrom, the cumulative or regenerative nature of the circuit drives the branches in their respective directions. Thus branch 33 flips into resonance and branch 31 flops out. It has been observed that the flip-flop action occurs within a period of a few cycles of the working frequency.

The impedance 35 is selected to insure that only one of the branches can be in resonance at a time. It will be seen that, if branches 31 and 33 should both tend to go into resonance simultaneously, the voltage at P would fall so low due to the additional drop in voltage across impedance 35 that neither branch would have sufficient voltage to drive it to resonance. Or, if both branches should tend, at the same time, to drop away from resonance, the voltage at point P would rise above the critical value so that one or the other of the branches would snap into resonance.

Viewed somewhat differently, the operation of the circuit of Fig. 8 can be explained in the following manner. Assuming that the circuit is completely symmetrical and that one of the branches, say branch 31, is initially in the high-current state, as a result of the application of a pulse from source 57, there is an increase of current in inductor 43 and the effective inductance of the inductor 43 is reduced, as illustrated in the curve of Fig. 4. If the inductances 39 and 43 are initially greater than those required for resonance at the supply frequency, the decrease of inductance causes the current to increase further and the voltage at P correspondingly falls. Because of the reduction of voltage across the parallel branches, inductor 39 now carries less current and its effective inductance increases in accordance with the curve of Fig. 4. This increase of effective inductance produces further a decrease of current in inductor 39. If the resonance curve is steep, the action may become cumulative or regenerative, the current in inductor 43 rising abruptly to a high value and that in inductor 39 simultaneously falling to a relatively low value. Thus, the branch 31 tends towards a condition of short circuit and the branch 33 simultaneously tends toward a condition of open circuit. In a similar manner it may be shown that if a succeeding pulse is applied the current in inductor 39 increases abruptly to a high value and that in inductor 43 falls to a very low value.

There has thus been described a flip-flop circuit consisting of a pair of ferroresonant branch circuits which is characterized in that either of a pair of stable states may be excited and retained for any period determined only by the frequency of the applied triggering voltage. The flip-flop of this invention can be utilized in arrangements where high ambient temperatures preclude the use of metallic rectifiers and thus eliminate conventional magnetic trigger circuits or where power requirements or high frequencies limit the use of metallic rectifiers. The circuit of this invention can be used where short response time or rapid repetition rates are required, and generally in place of vacuum tube trigger circuits.

Although the novel features of our flip-flop circuit have been described hereinabove in connection with ferroresonant circuits including a non-linear inductance, it will be understood that these features can be accomplished through the use of circuits including non-linear capacitors in combination with linear inductances. Such modifications are believed to be within the scope of our invention and will be apparent to those skilled in the art.

It will be appreciated further that the triggering means illustrated and described hereinabove in connection with the circuits of Figs. 5–7 can be used with the circuit of Fig. 8.

While a specific embodiment has been shown and described, it will, of course, be understood that various modifications may be made without departing from the principles of the invention. The appended claims are, therefore, intended to cover any such modifications within the true spirit and scope of the invention.

What we claim as new and desire to secure by Letters Patent of the United States is:

1. In a flip-flop circuit, an alternating voltage input circuit having impedance, a pair of branch circuits shunt connected across said input circuit, each said branch comprising a series arrangement of a capacitance and an inductor, said inductors having inductance values variable in accordance with current therein, a source of voltage, and means for applying said voltage to said branches to vary the current therein in accord with the magnitude of said voltage, whereby when either of said circuits becomes ferroresonant a greater current flows in said impedance tending to reduce the voltage applied to the other circuit.

2. A flip-flop circuit, comprising an alternating voltage input circuit, a pair of branch circuits shunt connected across said input circuit, each said branch comprising a ferroresonant circuit arrangement including a saturable-core inductor, and a source of signal voltage for periodically supplying voltage impulses simultaneously to said branch circuits, whereby the inductance values of said inductors are caused to vary.

3. A flip-flop circuit having two stable states of conduction, comprising a pair of branch circuits shunt connected to each other and to a source of alternating voltage, each said branch comprising a series resonant non-linear circuit arrangement of a capacitance and saturable-core inductor, said inductors having inductance values variable in accordance with current therein, means maintaining one said branch in a state of high-current conduction while the other in a state of low-current conduction, and means for varying the current in said branch circuits, whereby to produce simultaneous changes of state in each said branch.

4. The circuit as defined in claim 3, wherein said last-named means comprises a source of voltage impulses coupled for simultaneous excitation of said inductors.

5. In a flip-flop circuit, an alternating voltage input circuit, including an impedance, a pair of non-linear circuits shunt connected to each other and to said input circuit, and electric-circuit means coupled to said circuits for varying the current in said branch circuits simultaneously and in opposite senses, whereby one said circuit is caused to assume a high-current-conduction state and the other said circuit simultaneously assumes a low-current-conduction state.

6. A wave translating circuit, comprising two branches arranged electrically in parallel, each branch including an inductor and a capacitor in series with said inductor, an alternating voltage input circuit connected across said branches and of sufficient magnitude to maintain one said branch in a first stable state of conduction and simultaneously to maintain the other said branch in a second stable state of conduction, and a source of electrical impulses connected in energy coupling relation with said inductors, whereby excitation of said branches by said impulses tends to reduce the impedance of one said branch and simultaneously to increase the impedance of the other said branch, and an output connection associated with one said branch.

7. In combination, a source of alternating electromotive force, a pair of branches connected across said source through a common impedance, each of said branches comprising an inductance having an iron core and a capacitance in series, said electromotive force and impedance being of such value that one of said branches is resonant and the other non-resonant, and means to apply a control voltage to both of said branches to cause said one branch to become non-resonant and said other branch resonant.

CHARLES F. SPITZER.
ROBERT J. REICH.

No references cited.

Notice of Adverse Decision in Interference

In Interference No. 86,935 involving Patent No. 2,653,254, C. F. Spitzer and R. J. Reich, Nonlinear resonant flip-flop circuit, final judgment adverse to the patentees was rendered Oct. 9, 1956, as to claims 1, 3, 5, 6, and 7.

[*Official Gazette April 9, 1957.*]